United States Patent [19]

Roe

[11] Patent Number: 4,992,804
[45] Date of Patent: Feb. 12, 1991

[54] MODULATED BEAM SCANNING WITH PIXAL EXPOSURE CONTROL

[75] Inventor: Malcolm D. M. Roe, Herts, England

[73] Assignee: Crosfield Electronics Limited, London, England

[21] Appl. No.: 348,523

[22] Filed: May 8, 1989

[30] Foreign Application Priority Data

Jun. 20, 1988 [GB] United Kingdom ............... 8814624

[51] Int. Cl.$^5$ .................................................. H04N 1/21
[52] U.S. Cl. ...................................... 346/108; 358/298
[58] Field of Search ............... 346/108, 107 R, 160, 346/1.1; 358/296, 298

[56] References Cited

U.S. PATENT DOCUMENTS

| 3,029,387 | 4/1962 | Moe . | |
|---|---|---|---|
| 4,491,875 | 1/1985 | Kawamura | 358/298 |
| 4,541,116 | 9/1985 | Lougheed | 382/49 |
| 4,661,859 | 4/1987 | Mailloux et al. | 358/298 |

OTHER PUBLICATIONS

"Laser-Scanning Parameters and Latitudes in Laser Xerography", by Sonnenberg, Applied Optics, vol. 21, No. 10, pp. 1745-1751.
"Pre-Processing Techinques for Digital Facsimile", David Ting et al., *Conference Record*, 1978 International Conference on Communications, vol. 3, Toronto, Canada, Jun. 4-7, 1978.

*Primary Examiner*—Mark J. Reinhart
*Attorney, Agent, or Firm*—Sughrue, Mion, Zinn, Macpeak & Seas

[57] ABSTRACT

Apparatus for modulating a radiation beam during relative scanning movement between the beam and the record medium. The apparatus comprises a beam modulator which is operable to modulate the power level of the beam in accordance with a binary control signal so as selectively to expose the record medium in use to record and image on the record medium. Each bit of the control signals corresponds to a respective output pixel of the image. An exposure control system determines, prior to the modulation step, the pattern of control signal bits corresponding to image pixel in an area containing the pixels to be exposed, and causes the modulator to modulate the radiation beam to take up an output power level corresponding to the determined pattern during exposure of that pixel.

9 Claims, 2 Drawing Sheets

4,992,804

MODULATED BEAM SCANNING WITH PIXAL EXPOSURE CONTROL

FIELD OF THE INVENTION

The invention relates to methods and apparatus for modulating a radiation beam.

DESCRIPTION OF THE PRIOR ART

Many image raster output devices are binary in nature. That is, each point in the image is marked as either on or off, often corresponding to black and white. This is suitable for line work and can also be made to produce a continuous tone effect by converting an image into a half-tone before output.

The modulation or control signal for these binary output devices is usually developed on the assumption that the output marking process is perfect in the sense that each pixel is wholly registered as "on" or "off". In practice, this does not happen, particularly if the marking process involves a laser spot exposing a high gamma film. The shape of a laser dot is circular with a gaussian intensity profile and this makes it difficult to fill completely a square or rectangular pixel in the output image. These problems are considered in "Laser-Scanning Parameters and Latitudes in Laser Xerography" by Sonnenberg, Applied Optics, vol. 21, number 10, pages 1745–1751. This paper shows that there is no one combination of laser intensity and spot size that is ideal and that the best that can be done is to use some compromise setting. This is a particular problem where a half-tone reproduction is concerned. If an output pixel cannot be accurately exposed, there will be a change in the total area of a half-tone dot leading to a shift in grey level which can produce a colour shift in the resultant image formed by superposed colour separations. Furthermore these changes in dot area occur in a cyclic manner and can lead to the generation of artificial moire patterns.

U.S. patent application No. 4,491,875 describes apparatus for applying a dither matrix within a single pixel in which the pixel is broken down in to micro-pixels each of which is associated with one location in the dither matrix. The value associated with the pixel is then compared with each value in the dither matrix and the micro-pixel illuminated accordingly. This system is of no use in solving the problems addressed above since it takes no account of the position of the pixel in the image.

An article entitled "Pre-Processing Techniques for Digital Facsimile" in IEEE. International Conference on Communications 4th-7th June 1978, Toronto, Vol 3, pages 48.5.1–48.5.6 describes various methods for smoothing images which are scanned by facsimile machines for subsequent transmission. The intention is to reduce noise effects. In one method, a window is passed across the image and the colour of pixel at the centre of the window (black or white) is determined in accordance with the number of black pixels within the window. This smoothing technique simply looks at the average blackness within the window and decides on the black or white form of the centre pixel accordingly. Again, this is of little relevance to the present invention which is concerned with an output scanner and not an input scanner and also with preserving sharp changes in the form of an output image rather than smoothing out such changes.

SUMMARY OF THE INVENTION

In accordance with one aspect of the present invention, a method of modulating a radiation beam during relative scanning movement between the beam and a record medium in which the power level of the beam is modulated in accordance with a binary control signal to record an image on the record medium, each bit of the control signal corresponding to a respective output pixel of the image is characterised by, prior to the modulation step, determining the pattern of control signal bits corresponding to image pixels in an area containing the pixel to be exposed, and causing the radiation beam to take up an output power level corresponding to the determined pattern during exposure of that pixel.

In accordance with a second aspect of the present invention, apparatus for modulating a radiation beam during relative scanning movement between the beam and a record medium comprises a beam modulator which is operable to modulate the power level of the beam in accordance with a binary control signal so as selectively to expose the record medium in use to record an image on the record medium, each bit of the control signal corresponding to a respective output pixel of the image; and exposure control means for determining, prior to the modulation step, the pattern of control signal bits corresponding to image pixels in an area containing the pixel to be exposed, and for causing the modulator to modulate the radiation beam to take up an output power level corresponding to the determined pattern during exposure of that pixel.

This invention improves upon the problems that are set out above by considering for the first time the location of a pixel to be exposed relative to its immediate neighbours. Thus, in the case where there is a sharp turn in the image, a pixel at the corner of this turn would previously not have been fully exposed leading to a significant error in the exposed area. With the invention, however, the pattern of pixels in the vicinity of this turn will be determined so that the fact that the pixel to be exposed is at a corner can be noted and the radiation beam caused to take up a suitable power level to achieve full exposure.

In general, the determination step will comprise comparing the control signal bits corresponding to image pixels in an area containing the pixel to be exposed with a number of different predetermined patterns, each of which is associated with a respective power level. Conveniently, the determination step comprises comparing the control signal bits corresponding to image pixels in an area containing the pixel to be exposed with a set of all possible patterns for that area of pixels wherein the radiation beam is caused to take up the output power level associated with the predetermined pattern with which a successful comparison is made. In this latter case, a simple look-up table can be set up having an address corresponding to each possible pattern of image pixels and containing a corresponding beam intensity encoded in digital form. In practice the same beam intensity may be associated with more than one pattern.

Typically, the exposure control means will comprise a store for storing the control signal bits corresponding to image pixels in an area containing the pixels to be exposed, the store being connected to a memory defining a look-up table which is addressed by the content of the store, each address of the memory containing a beam intensity value for controlling the modulator.

The control signal may define a text image or a graphics (continuous tone) image which, in the latter case, is represented by a half-tone dot pattern.

The radiation beam will typically comprise a laser beam while the modulator may comprise an acousto-optic or an electro-optic modulator. Alternatively, the laser source itself (such as a laser diode) could be directly modulated.

Typically, the area of image pixels which is used in the determination step will be defined by an area of $3 \times 3$ pixels with the pixel to be exposed at its centre.

BRIEF DESCRIPTION OF THE DRAWINGS

An example of a method and apparatus in accordance with the present invention will now be described and contrasted with a known method with reference to the accompanying drawings in which.

DETAILED DESCRIPTION OF AN EMBODIMENT

A typical facsimile machine scans an original image containing half-tone dots and/or line work produced by any known method and transmits the result to a similar output machine. Typically, such a machine may take about 8 to 10 samples in the pitch of a half-tone dot. Because of this there is, in general, no simple relationship between the sample pitch and the half-tone dots. This is one of the reasons why moire can be a problem.

Figure 1:
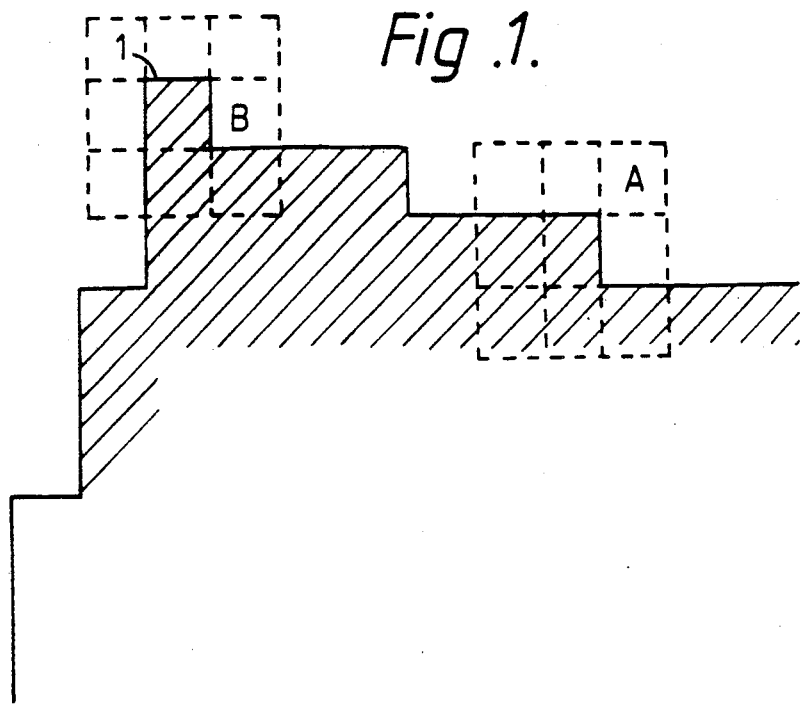
FIG. 1 illustrates part of an idealised half-tone dot corresponding to a particular control signal.

FIG. 1 illustrates a portion of a half-tone dot defined by a set of square output pixels. In an ideal situation, a laser beam is caused to expose a record medium such that each output image pixel is either totally exposed or not exposed in accordance with a binary control signal (CS). FIG. 1 illustrates an idealised 90° corner in which the output pixels are shown by dashed lines and those which are exposed are hatched. This particular shape requires a substantially isolated output pixel 1.

Figure 2:
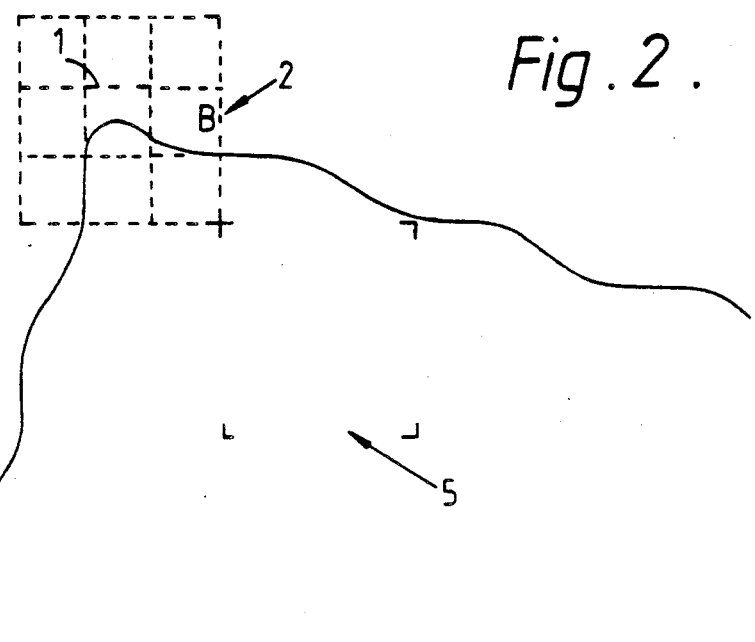
FIG. 2 illustrates an example of the output from conventional apparatus in response to the control signal referred to above.

FIG. 2 illustrates an example of a practical exposure of a record medium in response to the signal CS in which the laser beam can take up one of only two power levels. It can be seen by comparing FIGS. 1 and 2 that in practice straight edges are reproduced fairly accurately but corners, such as the 90° corner shown in FIG. 1, are not. A stepped corner such as at "A" both gains and loses some area and these roughly (but not exactly) cancel out. However, a corner such as that at "B" gains some area but loses much more. It is at this type of corner that the worst errors occur, although type "A" corners, being more frequent, may have a greater overall effect.

In this example of the invention, the exposing laser beam can be controlled to take up one of a large number of power levels. The apparatus to be described below determines the power level of the laser beam by looking at a $3 \times 3$ neighbourhood of output image pixels centred on the pixel to be exposed. Thus, in the case of the example shown in FIG. 2, when the pixel to be exposed is the pixel labelled 1, the apparatus looks at an area 2 of 9 pixels centred on the pixel 1. The bits of the binary control signal CS corresponding to this area 2 have the form:

000
010
011

Figure 3:
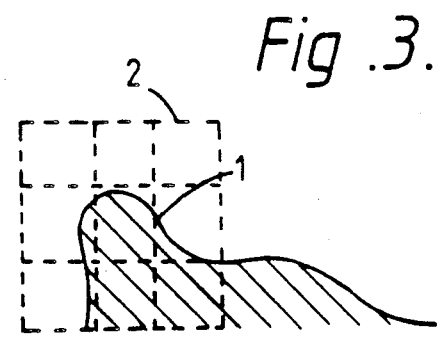
FIG. 3 illustrates a portion of the idealised half-tone dot shown in FIG. 1 following the performance of a method according to the invention; and, FIG. 4 is a block diagram of apparatus for carrying out methods in accordance with the invention.

This pattern of control signal bits indicates that a particular form of 90° corner is involved with a nearly isolated pixel and as a result the laser beam is controlled to expose the output image pixel 1 at a special higher power level. This will result in the region of the record medium corresponding to the output image pixel 1 being exposed to a higher than normal power level resulting in more of the pixel region being recorded than in the conventional case (FIG. 2) as is illustrated in FIG. 3.

Figure 4:
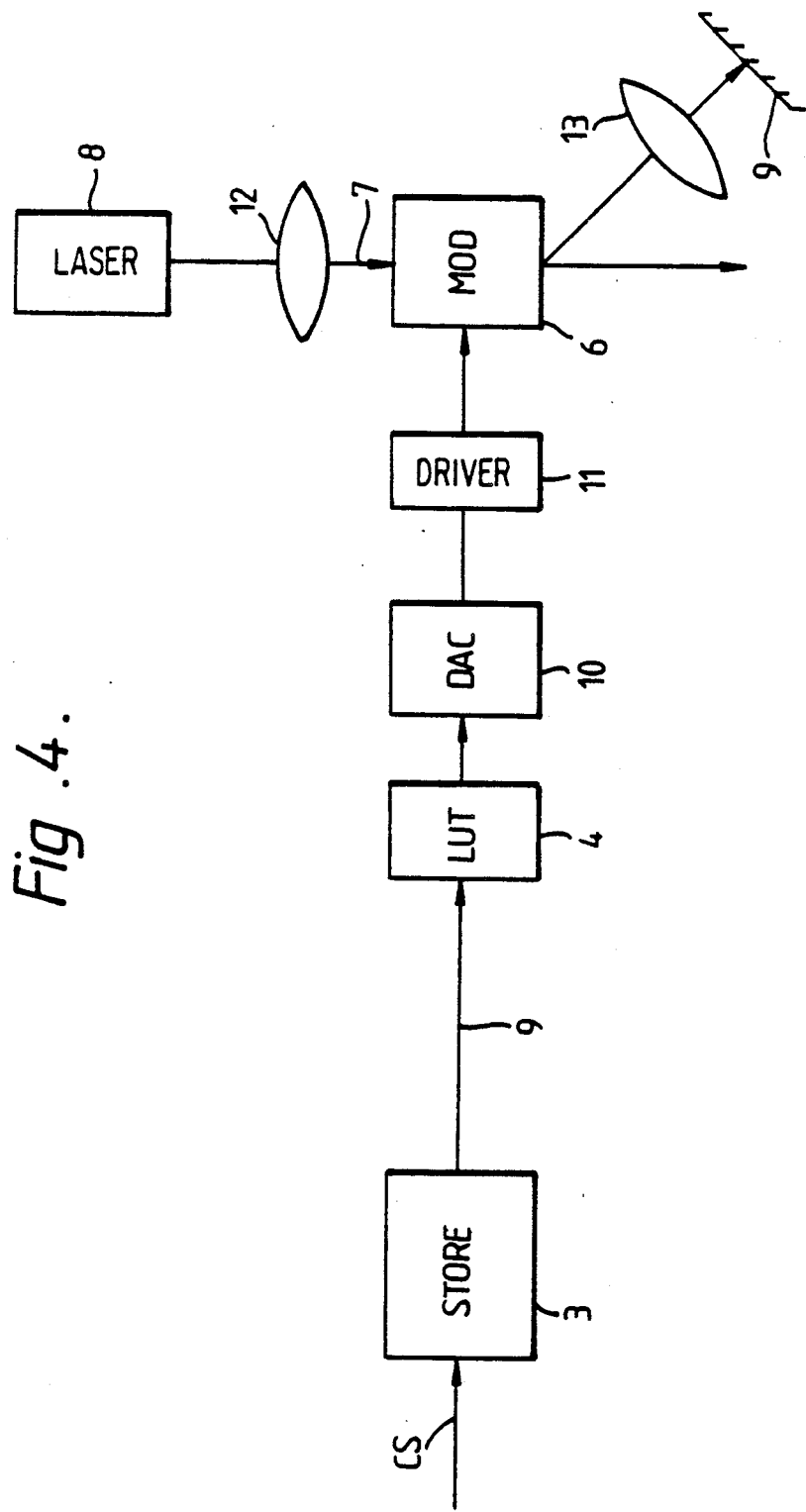

An example of apparatus suitable for carrying out methods in accordance with the invention is shown in FIG. 4. The apparatus comprises a store 3 having dimensions $3 \times N$ where N is the total number of output pixels in a single scan line of the laser beam across the record medium. The binary control signal CS is supplied to the store 3 which is of the FIFO type and which stores each value of the control signal for the last three lines of the image. The signal CS is generated in a conventional manner, for example by a facsimile machine.

The apparatus also comprises a memory 4 defining a look-up table (LUT) which, in this example, where neighbourhoods of $3 \times 3$ output pixels are used, has 512 addresses corresponding to every possible variation of control signal bits in a $3 \times 3$ area. For each version of the $3 \times 3$ area, the look-up table 4 contains a modulator control signal in the range 0–255. For example, in the case mentioned above, the address corresponding to the region 2 will contain a modulator control signal indicating that a higher power level is required. However, in a region such as the region 5 (in which each output pixel corresponds to control signal with a value 1) the LUT 4 will store a modulator control signal to cause the record medium to be exposed to a different lower or normal power level.

The digital output signal from the LUT 4 is fed to a digital-to-analogue converter 10 whose output signal is passed to a driver 11 and then to a laser beam modulator 6, such as an acousto-optic modulator to which is also supplied a laser beam 7 from a laser 8 via a lens 12.

If the modulator control signal from the LUT 4 has a value "zero" then the laser beam 7 passes undeflected through the modulator 6 and is not incident on a record medium 9. If the modulator control signal has a value corresponding to an exposing power level, then the input laser beam 7 is partially or completely deflected onto the record medium 9 via a lens 13 with the remainder of the beam being guided past the record medium 9. If the modulator control signal has a value corresponding to the highest output power level, then the full input beam 7 is deflected onto the record medium 9.

In use, relative scanning movement is caused between the laser beam output from the modulator 6 and the record medium 9 by, for example, mounting the record medium 9 on a rotating cylinder and the modulator 6 on a lead screw parallel with the cylinder which tracks the modulator 6 along the side of the cylinder.

I claim:

1. A method of modulating a radiation beam during relative scanning movement between said beam and a record medium in which the power level of said beam is modulated in accordance with a binary control signal to record an image on said record medium, each bit of said control signal corresponding to a respective output pixel of said image wherein prior to said modulation step, determining the pattern of said control signal bits corresponding to image pixels in an area containing the pixel to be exposed, and causing said radiation beam to take up an output power level corresponding to said determined pattern during exposure of that pixel.

2. A method according to claim 1, wherein said determination step comprises comparing said control signal bits corresponding to image pixels in an area containing said pixel to be exposed with a number of different predetermined patterns, each of which is associated with a respective power level.

3. A method according to claim 2, wherein said determination step comprises comparing said control signal bits corresponding to image pixels in an area containing the pixel to be exposed with a set of all possible patterns for that area of pixels wherein said radiation beam is caused to take up the output power level associated with the predetermined pattern with which a successful comparison is made.

4. A method according to claim 2, wherein at least some of said predetermined patterns are associated with the same power level.

5. A method according to claim 1, wherein said radiation beam comprises a laser beam.

6. A method according to claim 1, wherein said area of image pixels used in said determination step is defined by an area of 3×3 pixels with said pixel to be exposed at its centre.

7. Apparatus for modulating a radiation beam during relative scanning movement between said beam and a record medium, the apparatus comprising a beam modulator which is operable to modulate the power level of said beam in accordance with a binary control signal so as selectively to expose said record medium in use to record an image on said record medium, each bit of said control signal corresponding to a respective output pixel of said image; and exposure control means for determining, prior to said modulation step, the pattern of control signal bits corresponding to image pixels in an area containing the pixel to be exposed, and for causing said modulator to modulate said radiation beam to take up an output power level corresponding to said determined pattern during exposure of that pixel.

8. Apparatus according to claim 7, wherein said exposure control means comprises a store for storing said control signal bits corresponding to image pixels in an area containing the pixels to be exposed, said store being connected to a memory defining a look-up table which is addressed by said content of said store, each address of said memory containing a beam intensity value for controlling said modulator.

9. Apparatus according to claim 7, wherein said beam modulator comprises an acousto-optic or an electro-optic modulator.

* * * * *